UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

CELLULOSE-ESTER COMPOSITION.

1,309,980.     Specification of Letters Patent.     Patented July 15, 1919.

No Drawing.     Application filed April 26, 1919.  Serial No. 293,005.

*To all whom it may concern:*

Be it known that I, HANS T. CLARKE, a subject of the King of Great Britain, residing at Rochester, in the county of Monroe and State of New York, have invented certain new and useful Improvements in Cellulose-Ester Composition, of which the following is a full, clear, and exact specification.

This invention relates to a new composition of matter and a method of making the same, in which a cellulose ester is combined or mixed with other substances, so that the resulting product can be advantageously used in the plastic and analogous arts, such, for instance, as sheet or film manufacture and varnish manufacture.

One object is to produce a composition which may be made into permanently transparent, strong and flexible sheets or film of desired thinness that are substantially waterproof, are unaffected by ordinary photographic fluids and possess the desired properties of a support for sensitive photographic coatings. Another object of my invention is to produce a composition of matter capable of easy manipulation in the plastic and film making or varnish making arts; which will not injure or be injured by the substances with which it is associated during manufacture, storage, or use. Another object of my invention is to provide a process for compounding such a composition of matter. Further objects will hereinafter appear.

I have discovered that a composition of matter having the desirable qualities hereinabove enumerated can be obtained by mixing or compounding a cellulose ester, like cellulose acetate, with oxalates which are only slightly volatile or non-volatile at ordinary temperatures. The preferred oxalates for this purpose are typified in the following formulæ in which A and B represent alkyl groups containing 4 to 5 carbon atoms:

The compounding is most readily performed by using a solvent common to both the cellulose ester and the oxalate. Examples of suitable oxalates are dibutyl oxalate and diamyl oxalate. These may be used mixed or singly and the degree of purity will depend upon the purpose to which the plastic composition is to be put. They have high boiling points and are very stable.

As a useful example dibutyl oxalate is selected. This is a colorless liquid boiling under atmospheric pressure at about 243° C., and at 113° C., when under 10 mm. pressure. It has a very faint characteristic odor and is practically insoluble in water.

In carrying out one illustration of my invention, I incorporate in 60 parts of acetone and methyl alcohol, or any desired mixture of the two, 10 parts cellulose acetate, and 4 parts of dibutyl oxalate. The proportion of these ingredients may be varied within certain limits. The acetone or methyl acetate may be present in from 40 to 100 parts, and the butyl oxalate in from 1 to 10 parts. The ingredients are mixed to form a homogeneous solution or flowable mass and are filtered if desired. High boiling auxiliary softeners may be added if desired, such as higher aliphatic alcohols or their esters, such as fusel oil, amyl acetate, butyl acetate, ethyl propionate, ethyl butyrate, etc. If one of these is used a smaller amount of the dibutyl oxalate is necessary. For instance, in the formula given above the number of parts of butyl oxalate that is preferable would be 3 when 3 parts of fusel oil are used. However, in this case, the dibutyl oxalate may be present in from 1 to 6 parts and the higher aliphatic alcohol in from 1 to 4 parts. There may be added further any softener, such as urea, castor oil, camphor, triphenyl phosphate, dibutyl sulfone or monochlornaphthalene in from 1 to 10 parts, 2 parts being preferred.

The solution, either with or without the additional high boiling softener, is sufficiently thick and viscous to be properly flowed during sheet or film manufacture, the acetone or methyl acetate volatilizing but not too rapidly to impair the product. The resulting film containing cellulose acetate and oxalate, together with the additional high boiling softener if the latter is used, is very flexible, transparent, and uniform so that it can be used for any usual or preferred purpose. It is practically waterproof and unaffected by ordinary photographic chemicals. In my co-pending application, Serial No. 293006, filed of even date herewith, I have disclosed a composition and process of compounding it in which cellulose nitrate is mixed with certain oxalates and a common solvent, such as acetone and methyl alcohol, small amounts of high boiling softeners being added if desired. For a fuller description of this cellulose nitrate species of my invention, reference should be had to said application.

While I have hereinabove disclosed certain compositions and processes by way of example, my invention is not limited thereto nor to the proportions given therein, my experiments indicating that the proportions may be varied from those given and equivalent substances may be substituted without departing from the principle of my invention as defined in the appended claims.

Having thus described my invention, what I claim as new and desire to secure by Letters Patent is:

1. A composition of matter comprising a cellulose ester and a dialkyl ester of oxalic acid in which each of the alkyl groups contains from 4 to 5 carbon atoms.

2. A composition of matter comprising a cellulose ester, a dialkyl ester of oxalic acid in which each of the alkyl groups contains from 4 to 5 carbon atoms and a solvent common to both.

3. A composition of matter comprising a cellulose ester and dibutyl oxalate.

4. A composition of matter comprising a cellulose ester, dibutyl oxalate and a solvent common to both.

5. A composition of matter comprising cellulose acetate and a dialkyl ester of oxalic acid in which each of the alkyl groups contains from 4 to 5 carbon atoms.

6. A composition of matter comprising cellulose acetate, a dialkyl ester of oxalic acid in which each of the alkyl groups contains from 4 to 5 carbon atoms and a solvent common to both.

7. A composition of matter comprising cellulose acetate and dibutyl oxalate.

8. A composition of matter comprising acetone 40 to 100 parts, cellulose acetate 10 parts, dibutyl oxalate 1 to 10 parts.

9. As an article of manufacture, a sheet of deposited or flowed cellulose ester containing a dialkyl ester of oxalic acid in which each of the alkyl groups contains from 4 to 5 carbon atoms.

10. As an article of manufacture, a sheet of deposited or flowed cellulose ester containing dibutyl oxalate.

11. As an article of manufacture, a sheet of deposited or flowed cellulose acetate containing a dialkyl ester of oxalic acid in which each of the alkyl groups contains from 4 to 5 carbon atoms and a high boiling auxiliary softener.

Signed at Rochester, New York, this 16th day of April 1919.

HANS T. CLARKE.